US012562412B2

(12) United States Patent    (10) Patent No.:   US 12,562,412 B2

Miyajima      (45) Date of Patent:    Feb. 24, 2026

(54) CALCULATION DEVICE AND ALL SOLID STATE BATTERY SYSTEM

(71) Applicant: TOYOTA JIDOSHA KABUSHIKI KAISHA, Toyota (JP)

(72) Inventor: Takayuki Miyajima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1029 days.

(21) Appl. No.: 17/678,418

(22) Filed: Feb. 23, 2022

(65) Prior Publication Data

US 2022/0285746 A1     Sep. 8, 2022

(30) Foreign Application Priority Data

Mar. 2, 2021    (JP) ................................. 2021-032520

(51) Int. Cl.
*H01M 10/48*       (2006.01)

(52) U.S. Cl.
CPC ........ *H01M 10/48* (2013.01); *H01M 2220/20* (2013.01)

(58) Field of Classification Search
CPC ........................... H01M 10/48; H01M 2220/20
See application file for complete search history.

(56) References Cited

U.S. PATENT DOCUMENTS

| | | | | |
|---|---|---|---|---|
| 9,393,921 | B1 * | 7/2016 | Weicker | .............. G01R 31/3835 |
| 2013/0295424 | A1 * | 11/2013 | Knoedgen | ......... H01M 10/4264 |
| | | | | 429/90 |

| | | | | |
|---|---|---|---|---|
| 2020/0106137 | A1 * | 4/2020 | Murphy | .............. H01M 10/425 |
| 2020/0164763 | A1 * | 5/2020 | Holme | .................... B60L 58/16 |
| 2021/0043987 | A1 * | 2/2021 | Choi | .................... G01R 31/374 |
| 2022/0238870 | A1 * | 7/2022 | Yura | ...................... H01M 4/525 |

FOREIGN PATENT DOCUMENTS

| | | | | | |
|---|---|---|---|---|---|
| EP | 2325664 | B1 * | 9/2018 | ......... H01M 10/486 |
| JP | 2014-003905 | A | 1/2014 | |
| JP | 2019-132696 | A | 8/2019 | |
| JP | 2020-013634 | A | 1/2020 | |
| JP | 2020-161300 | A | 10/2020 | |
| JP | 7196721 | B2 * | 12/2022 | ............. Y02E 60/10 |
| JP | 2019212600 | | * 12/2022 | ............. Y02E 60/10 |
| KR | 20210062263 | | * 5/2021 | ........... G01R 31/367 |

* cited by examiner

*Primary Examiner* — Stephanie E Bloss

(74) *Attorney, Agent, or Firm* — Dinsmore & Shohl LLP

(57) ABSTRACT

A main object of the present disclosure is to provide a calculation device capable of accurately calculating battery remaining of an all solid state battery. The present disclosure achieves the object by providing a calculation device configured to calculate battery remaining of an all solid state battery including a cathode layer, a solid electrolyte layer, and an anode layer, the calculation device comprising: a setting unit configured to set a Li occupancy state in a thickness direction of an electrode layer which is at least one of the cathode layer and the anode layer, based on operation history of the all solid state battery; and a calculating unit configured to calculate the battery remaining based on the Li occupancy state.

8 Claims, 6 Drawing Sheets

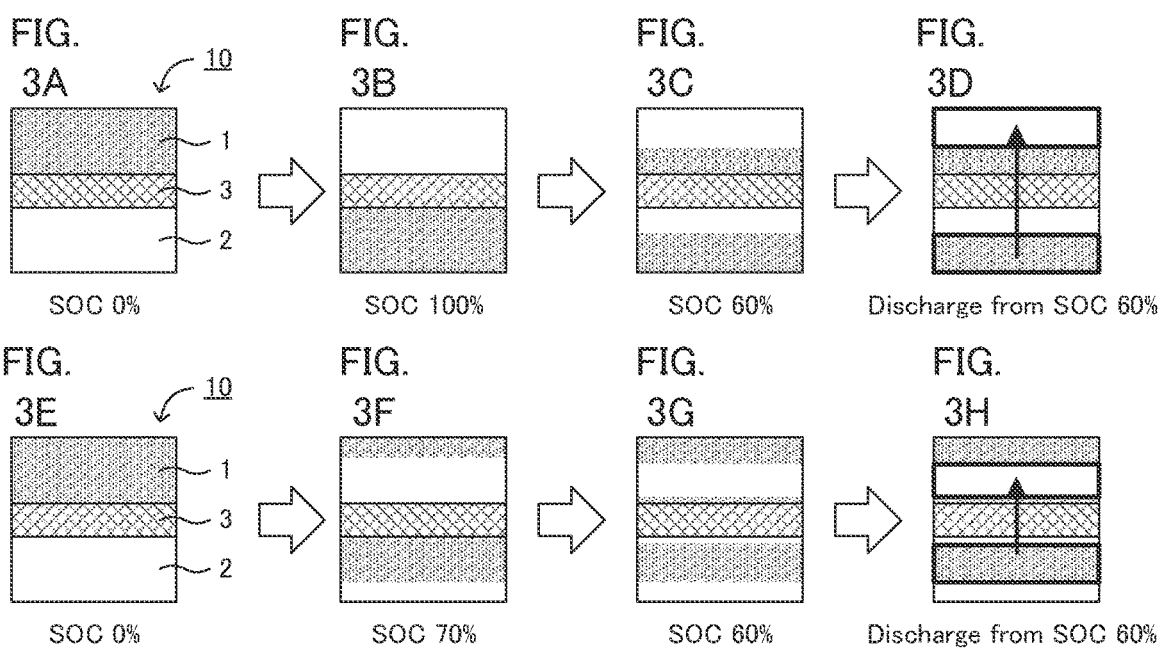
FIG. 3A
SOC 0%
FIG. 3B
SOC 100%
FIG. 3C
SOC 60%
FIG. 3D
Discharge from SOC 60%
FIG. 3E
SOC 0%
FIG. 3F
SOC 70%
FIG. 3G
SOC 60%
FIG. 3H
Discharge from SOC 60%
FIG. 4A
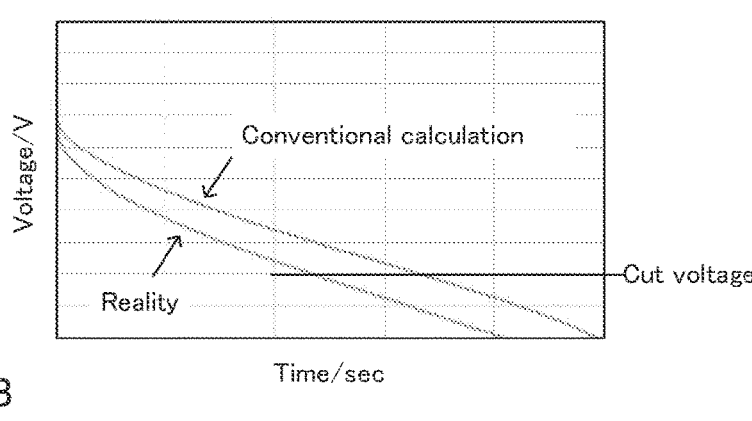
FIG. 4B
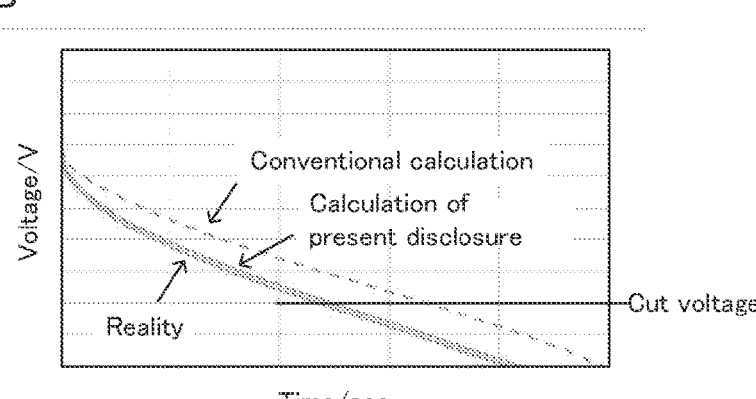

SOC 0%

SOC 100%

SOC 60%

SOC 30%

SOC 60%

FIG. 9A
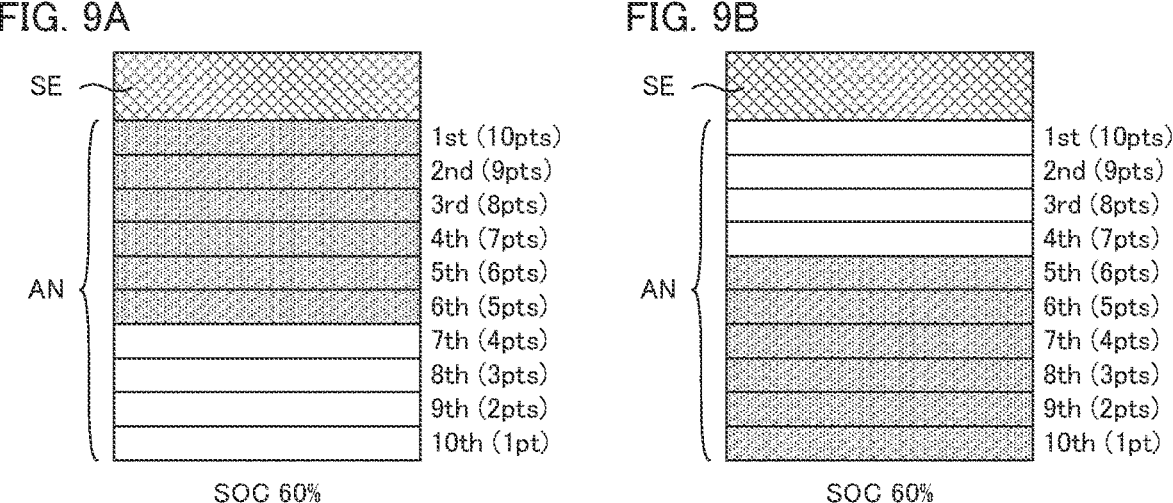
SE
AN
1st (10pts)
2nd (9pts)
3rd (8pts)
4th (7pts)
5th (6pts)
6th (5pts)
7th (4pts)
8th (3pts)
9th (2pts)
10th (1pt)
SOC 60%
FIG. 9B
SE
AN
1st (10pts)
2nd (9pts)
3rd (8pts)
4th (7pts)
5th (6pts)
6th (5pts)
7th (4pts)
8th (3pts)
9th (2pts)
10th (1pt)
SOC 60%
FIG. 10A
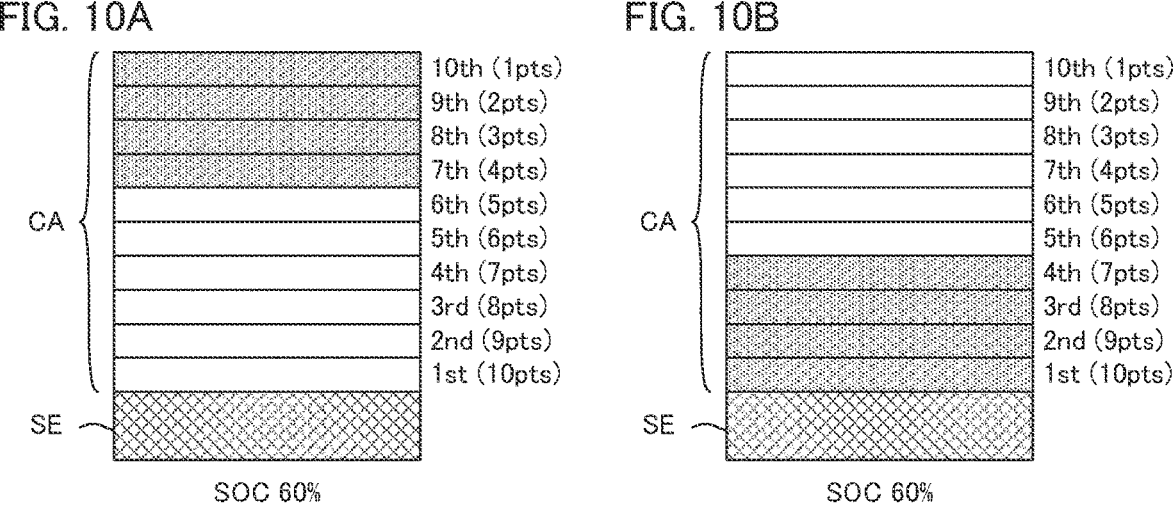
CA
10th (1pts)
9th (2pts)
8th (3pts)
7th (4pts)
6th (5pts)
5th (6pts)
4th (7pts)
3rd (8pts)
2nd (9pts)
1st (10pts)
SE
SOC 60%
FIG. 10B
CA
10th (1pts)
9th (2pts)
8th (3pts)
7th (4pts)
6th (5pts)
5th (6pts)
4th (7pts)
3rd (8pts)
2nd (9pts)
1st (10pts)
SE
SOC 60%

CALCULATION DEVICE AND ALL SOLID STATE BATTERY SYSTEM

CROSS-REFERENCE TO RELATED APPLICATIONS

This application is based upon and claims the benefit of priority of the prior Japanese Patent Application No. 2021-032520 filed Mar. 2, 2021, the entire contents of which are incorporated herein by reference.

TECHNICAL FIELD

The present disclosure relates to a calculation device and an all solid state battery system.

BACKGROUND ART

A calculation device configured to calculate a remaining battery capacity has been known. For example, Patent Literature 1 discloses a vehicular range arithmetic arrangement including remaining quantity calculation means configured to calculate a remaining quantity of power stored in a driving battery loaded on a vehicle. In this technique, a restrained power cost which is restrained fluctuation of power cost based on the remaining battery capacity, is calculated, and a vehicular range is calculated based on the remaining battery capacity and the restrained power cost, and thereby the reliability and adequacy of a calculated value of a range in relation to a range arithmetic arrangement are improved.

Meanwhile, Patent Literature 2 discloses a control device for an all solid state battery, the control device comprising estimating means configured to estimate a state of charge of the all solid state battery based on temperature and DC resistance, wherein the relationship between the charging state and the opening voltage is a hysteresis in charging and discharging.

CITATION LIST

Patent Literature

Patent Literature 1: Japanese Patent Application Laid-Open (JP-A) No. 2014-003905
Patent Literature 2: JP-A No. 2019-132696

SUMMARY OF DISCLOSURE

Technical Problem

In an all solid state battery, a solid electrolyte is used as an electrolyte, and thus charge and discharge unevenness (reaction unevenness) easily occurs in a thickness direction of an electrode layer (cathode layer, anode layer). Due to this charge and discharge unevenness, the remaining battery capacity which can be actually taken out may be different in some cases even when the open circuit voltage or the state of charge (SOC) of the all solid state battery is the same.

The present disclosure has been made in view of the above circumstances, and a main object thereof is to provide a calculation device capable of accurately calculating the remaining battery capacity of an all solid state battery.

Solution to Problem

In order to achieve the object, the present disclosure provides a calculation device configured to calculate a remaining battery capacity of an all solid state battery including a cathode layer, a solid electrolyte layer, and an anode layer, the calculation device comprising: a setting unit configured to set a Li occupancy state in a thickness direction of an electrode layer which is at least one of the cathode layer and the anode layer, based on operation history of the all solid state battery; and a calculating unit configured to calculate the remaining battery capacity based on the Li occupancy state.

According to the present disclosure, the Li occupancy state in the thickness direction of the electrode layer is set and the calculation is conducted based on the Li occupancy state; thereby, the remaining battery capacity of an all solid state battery may be accurately calculated.

In the disclosure, the setting unit may be configured to make a Li occupancy pattern corresponding to the operation history of the all solid state battery by using a model formed by dividing the electrode layer into a plurality of electrode structure layer along with the thickness direction, and is configured to set the Li occupancy state based on the Li occupancy pattern.

In the disclosure, the calculation device may further comprise a memory unit configured to memorize a map showing a relation of the Li occupancy state and the remaining battery capacity; wherein the calculating unit is configured to calculate the remaining battery capacity based on the Li occupancy state set in the setting unit, and the map.

In the disclosure, the calculation device may further comprise a predicting unit configured to predict provisional remaining battery capacity based on charge state of the all solid state battery; wherein the calculating unit is configured to calculate the remaining battery capacity based on the Li occupancy state set in the setting unit, and the provisional remaining battery capacity.

In the disclosure, the calculation device may comprise a correcting unit configured to correct the Li occupancy state set in the setting unit based on the operation history of the all solid state battery; and a feedback unit configured to feed back the corrected Li occupancy state to the calculating unit.

In the disclosure, the calculating unit, the correcting unit and the feedback unit may be configured to work during operation of the all solid state battery.

In the disclosure, the correcting unit may be configured to make a Li occupancy pattern corresponding to the operation history of the all solid state battery by using a model formed by dividing the electrode layer into a plurality of electrode structure layer along with the thickness direction, and may be configured to correct the Li occupancy state based on the Li occupancy pattern.

The present disclosure also provides an all solid state battery system comprising: an all solid state battery including a cathode layer, a solid electrolyte layer and an anode layer; and a calculation device configured to calculate a remaining battery capacity of the all solid state battery; wherein the calculation device is the above described calculation device.

According to the present disclosure, the arrangement of the above described calculation device allows an all solid state battery system to accurately calculate the remaining battery capacity of the all solid state battery.

Effects of Disclosure

The calculation device in the present disclosure exhibits an effect such that remaining battery capacity of an all solid state battery can be accurately calculated.

BRIEF DESCRIPTION OF DRAWINGS

FIG. 3A is an explanatory drawing exemplifying a state, where Li is included in a cathode layer but Li is not included in an anode layer, corresponds to SOC 0%.

FIG. 3B is an explanatory drawing exemplifying a state, where Li is included in the anode layer but Li is not included in the cathode layer, corresponds to SOC 100%.

FIG. 3C is an explanatory drawing exemplifying a state where the battery is discharged from SOC 100% to SOC 60%.

FIG. 3D is an explanatory drawing exemplifying a state where the battery is discharged from SOC 60%.

FIG. 3E is an explanatory drawing exemplifying a state, where Li is included in a cathode layer but Li is not included in an anode layer, corresponds to SOC 0%.

FIG. 3F is an explanatory drawing exemplifying a state where the battery is charged.

FIG. 3G is an explanatory drawing exemplifying a state where the battery is discharged from SOC 70% to SOC 60%.

FIG. 3H is an explanatory drawing exemplifying a state where the battery is discharged from SOC 60%.

FIG. 4A is an explanatory drawing explaining a difference in discharge behaviors due to charge and discharge unevenness.

FIG. 4B is an explanatory drawing explaining a difference in discharge behaviors due to charge and discharge unevenness.

FIG. 9A is an explanatory drawing exemplifying the state where Li is included in the anode structure layers closer to a solid electrode layer and an ion moving resistance during discharge is smallest.

FIG. 9B is an explanatory drawing exemplifying the state where Li is included in the anode structure layers father from a solid electrode layer and an ion moving resistance during discharge is largest.

FIG. 10A is an explanatory drawing exemplifying the state where Li is not included in the cathode structure layers closer to the solid electrolyte layer and the ion moving resistance during discharge is smallest.

FIG. 10B is an explanatory drawing exemplifying the state where Li is not included in the cathode structure layers farther from the solid electrolyte layer and the ion moving resistance during discharge is largest.

DESCRIPTION OF EMBODIMENTS

The calculation device and the all solid state battery system in the present disclosure are hereinafter explained in details.

A. Calculation Device

Figure 1:
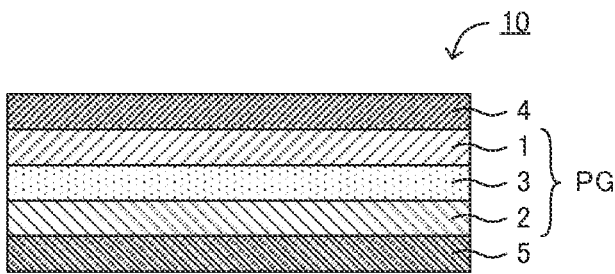
FIG. 1 is a schematic cross-sectional view exemplifying the all solid state battery in the present disclosure.

The calculation device in the present disclosure is a device configured to calculate a remaining battery capacity of an all solid state battery including a cathode layer, a solid electrolyte layer, and an anode layer. FIG. 1 is a schematic cross-sectional view exemplifying the all solid state battery in the present disclosure. All solid state battery 10 illustrated in FIG. 1 includes cathode layer 1, anode layer 2, solid electrolyte layer 3 arranged between the cathode layer 1 and the anode layer 2, cathode current collector 4 for collecting currents of the cathode layer 1, and anode current collector 5 for collecting currents of the anode layer 2. Also, the all solid state battery 10 shown in FIG. 1 is a single battery including one of power generating element PG (cathode layer 1, anode layer 2, and solid electrolyte layer 3), but the all solid state battery in the present disclosure may be an assembled battery including a plurality of the power generating element. Also, the plurality of the power generating element may be connected in series and may be connected in parallel.

Figure 2:
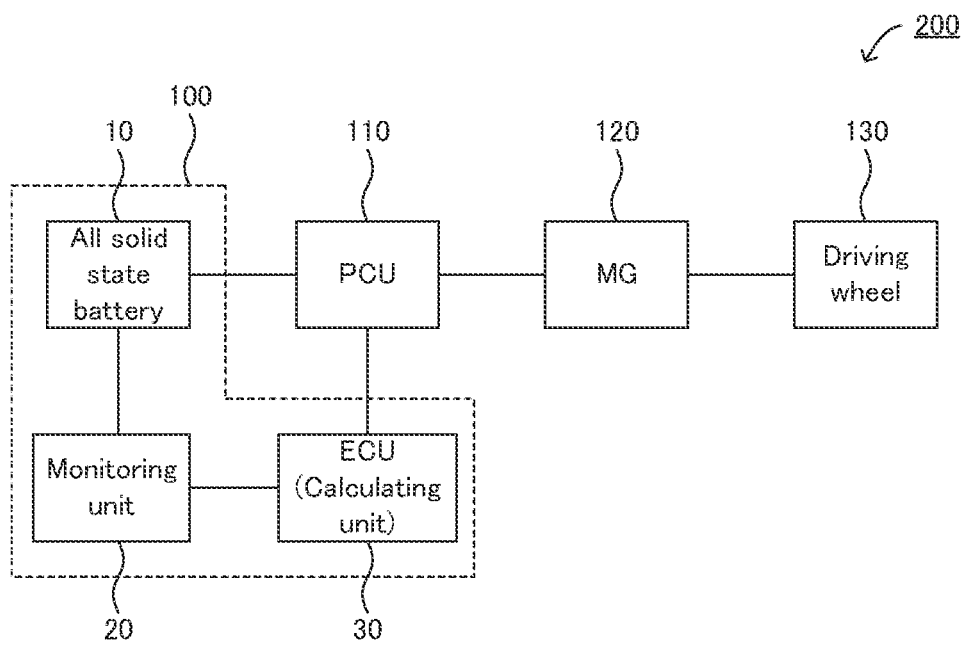
FIG. 2 is a diagram schematically exemplifying the calculation device in the present disclosure, the all solid state battery system including the calculation device, and the whole structure of a vehicle on which the all solid state battery system is loaded.

FIG. 2 is a diagram schematically exemplifying the calculation device in the present disclosure, the all solid state battery system including the calculation device, and the whole structure of a vehicle on which the all solid state battery system is loaded. Vehicle 200 is provided with all solid state battery system 100, power control unit (PCU) 110, motor generator (MG) 120, and driving wheel 130. The battery system 100 is provided with all solid state battery 10, monitoring unit 20 and electron control unit (ECU) 30.

The ECU 30 conducts various electron controls of the vehicle 200, but also works as a calculation device configured to calculate a remaining battery capacity of the all solid state battery 10. The calculation device comprises at least later described setting unit and calculating unit as a processing block for achieving its function. Also, the monitoring unit 20 monitors the state of the all solid state battery 10, and outputs the monitored result to the ECU 30.

According to the present disclosure, the Li occupancy state in the thickness direction of the electrode layer is set and the calculation is conducted based on the Li occupancy state; thereby, the remaining battery capacity of an all solid state battery may be accurately calculated. Here, as described above, in all solid state batteries, charge and discharge unevenness (reaction unevenness) remarkably occurs in a thickness direction of an electrode layer (cathode layer, anode layer). This point will be explained with reference to FIGS. 3A to 3H.

All solid state battery 10 illustrated in FIG. 3A includes cathode layer 1, solid electrolyte layer 3, and anode layer 2. As shown in FIG. 3A, the state, where Li is included in the cathode layer 1 but Li is not included in the anode layer 2, corresponds to SOC 0%. Next, when such all solid state battery 10 is completely charged, as shown in FIG. 3B, the state, where Li is included in the anode layer 2 but Li is not included in the cathode layer 1, is obtained; this state corresponds to SOC 100%.

Next, as shown in FIGS. 3B and 3C, the battery is discharged from SOC 100% to SOC 60%. On this occasion, in the anode layer 2, Li desorption reaction occurs in the region closer to the solid electrolyte layer 3 prior to the region far from the solid electrolyte layer 3. Conversely, in the cathode layer 1, Li intercalation reaction occurs in the region closer to the solid electrolyte layer 3 prior to the region far from the solid electrolyte layer 3. In a liquid battery, a liquid electrolyte having fluidity is used, and thus even reaction occurs in the thickness direction of the electrode. However, in an all solid state battery using a solid electrolyte not having fluidity, uneven reaction occurs in the thickness direction of the electrode layer. Next, as shown in FIG. 3D, when the battery is discharged from SOC 60%, Li included in the anode layer 2 (Li included in the region surrounded by black frame) moves to a Li non-existing region (region surrounded by black frame) in the cathode layer 1.

On the other hand, all solid state battery 10 shown in FIG. 3E corresponds to SOC 0% similarly to FIG. 3A. Next, when such all solid state battery 10 is charged, as shown in FIG. 3F, the state, where Li is included in the anode layer 2 and the cathode layer 1, can be obtained (SOC 70%). Next, as shown in FIGS. 3F and 3G, the battery is discharged from SOC 70% to SOC 60%. Next, as shown in FIG. 3H, when the battery is discharged from SOC 60%, Li included in the anode layer 2 (Li included in the region surrounded by black frame) moves to a Li non-existing region (region surrounded by black frame) in the cathode layer 1.

Here, when FIG. 3C and FIG. 3G are compared, the both are SOC 60%, but the Li occupancy states in the electrode layers are different. Also, when FIG. 3D and FIG. 3H are compared, moving distance of Li is long in FIG. 3D, and thus easily influenced by the Li moving resistance, but the moving distance of Li is short in FIG. 3H, and thus not easily influenced by the Li moving resistance. The influence of Li moving resistance affects the remaining battery capacity that can be actually taken out; thus, the remaining battery capacity that can be actually taken out may differ in all solid state batteries having the same SOC.

As a conventional method for calculating a remaining battery capacity, for example, a calculation method based on SOC has been known. As described above, since the remaining battery capacity that can be actually taken out may differ in all solid state batteries having the same SOC, as shown in FIG. 4A, there may be a gap between a discharge curve estimated from the conventional calculation and an actual discharge curve. In FIG. 4A, the actual discharge voltage reaches to the cut voltage faster than the discharge voltage estimated from the conventional calculation. For this reason, for example, in an all solid state battery loaded vehicle, travelable distance estimated from the conventional calculation may be estimated more than the actual travelable distance.

In contrast, in the present disclosure, the remaining battery capacity of an all solid state battery is calculated based on the Li occupancy state. For this reason, the remaining battery capacity of the all solid state battery can be accurately calculated. Also, as described later, by correcting the Li occupancy state repeatedly during the operation of the all solid state battery, as shown in FIG. 4B, the gap may be prevented from being generated between the discharge curve estimated from the calculation in the present disclosure and the actual discharge curve.

Figures 5A, 5B:
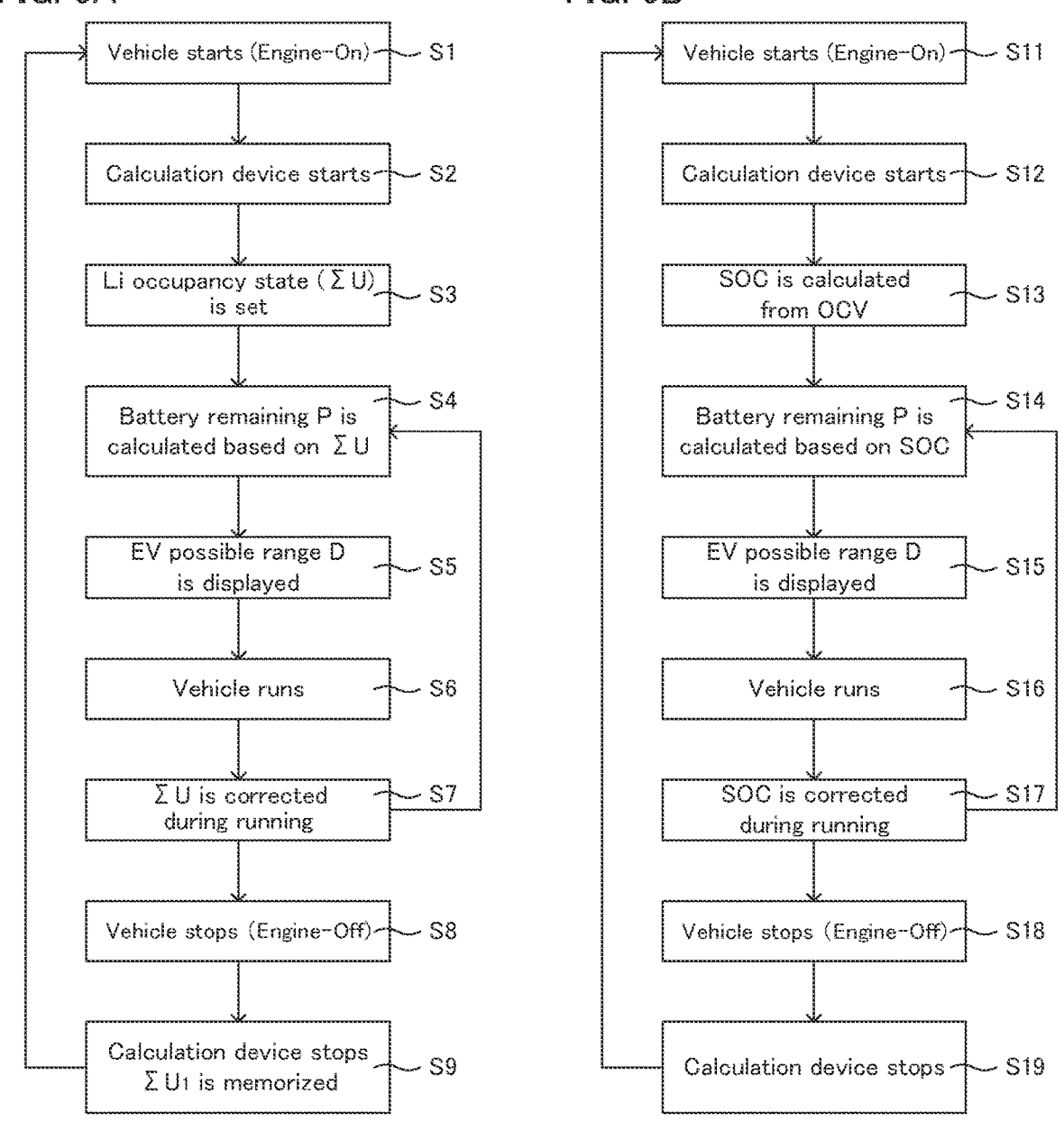
FIG. 5A is a flow chart exemplifying a method for calculating the remaining battery capacity.
FIG. 5B is a flow chart exemplifying a conventional method for calculating the remaining battery capacity.

FIG. 5A is a flow-chart exemplifying the method for calculating the remaining battery capacity in the present disclosure. Incidentally, the flow-chart is presuming a hybrid electric vehicle including a driving battery and an engine.

As shown in FIG. 5A, in step S1, the vehicle starts when the engine is turned on. In step S2, the calculation device starts, and in step S3, the calculation device sets a Li occupancy state ($\Sigma U$) in a thickness direction of an electrode layer. As the Li occupancy state ($\Sigma U$), for example, $\Sigma U_1$, a Li occupancy state at the time the vehicle previously stopped, is set. Incidentally, when the battery is charged from the time the vehicle previously stopped, for example, $\Sigma U_2$ is set based on $\Sigma U_1$ and the charge history. Also, when long time has passed since the time the vehicle previously stopped, for example, $\Sigma U_3$ is set based on $\Sigma U_1$ and self-discharge history. For example, when the vehicle starts for the first time, for example, $\Sigma U_4$ is set based on the production history of the all solid state battery. In step S4, the calculation device calculates a remaining battery capacity P based on $\Sigma U$. On this occasion, a relation of the Li occupancy state and the remaining battery capacity is prepared as a map (for example, a map considering SOC and temperature) in advance, and the remaining battery capacity P is calculated from that map and $\Sigma U$.

In step S5, the calculation device calculates EV possible range D based on the remaining battery capacity P and consumed electricity p, and the display device displays the range. For example, when the remaining battery capacity P is 8 kWh and the consumed electricity p is 10 km/kWh, the EV possible range D is 80 km. In steps S6 and S7, in the state where the vehicle can run (the state with the engine of the vehicle turned on), the calculation device corrects $\Sigma U$ based on the operation history of the all solid state battery to obtain $\Sigma U'$, and the $\Sigma U'$ is fed back to step S4 to calculate the remaining battery capacity P again. In steps S8 and S9, the vehicle stops when the engine is turned off, and the calculation device also stops. The calculation device memorizes the Li occupancy state ($\Sigma U_1$) at that point.

On the other hand, FIG. 5B is a flow-chart exemplifying the conventional method for calculating the remaining battery capacity. As shown in FIG. 5B, in step S11, the vehicle starts when the engine is turned on. In step S12, the calculation device starts, and in steps S13 and S14, the calculation device calculates SOC of the all solid state battery based on OCV and SOC-OCV curve, and the remaining battery capacity P is calculated based on that SOC.

In step S15, the calculation device calculates the EV possible range D based on the remaining battery capacity P and consumed electricity p, and the display device displays the range. In steps S16 and S17, in the state where the vehicle can run, the calculation device corrects SOC based on OCV to obtain SOC', and that SOC' is fed back to step S14 to calculate the remaining battery capacity P again. In steps S18 and S19, the vehicle stops when the engine is turned off, and the calculation device also stops. Compared to this calculation method, the calculation method in the present disclosure considers the influence of charge and discharge unevenness, and thus the accuracy of the calculated remaining battery capacity is higher.

The calculation device in the present disclosure is configured to set the Li occupancy state in the thickness direction of the electrode layer, and configured to calculate the remaining battery capacity of the all solid state battery based on that Li occupancy state. The calculation device includes CPU (Central Processing Unit), memory, and input and output port for inputting and outputting various signals. The memory includes, for example, ROM (Read Only Memory), RAM (Random Access Memory), and rewritable nonvolatile memory. Various controls are conducted when CPU performs programs memorized in the memory. Various processing performed by the calculation device is not limited to the processing by software, but the processing can be also performed by a dedicated hardware (electronic circuit).

The calculation device in the present disclosure comprises at least a setting unit and a calculating unit as a processing block for achieving its functions. Also, the calculation device may further comprise various processing blocks such as a memory unit, a predicting unit, a correcting unit, and a feedback unit described later.

1. Setting Unit

The setting unit in the present disclosure is configured to set a Li occupancy state in a thickness direction of an electrode layer which is at least one of the cathode layer and the anode layer, based on operation history of the all solid state battery. The electrode layer for setting the Li occupancy state may be one of the cathode layer and the anode layer, and may be the both of the cathode layer and the anode layer.

Figure 6:
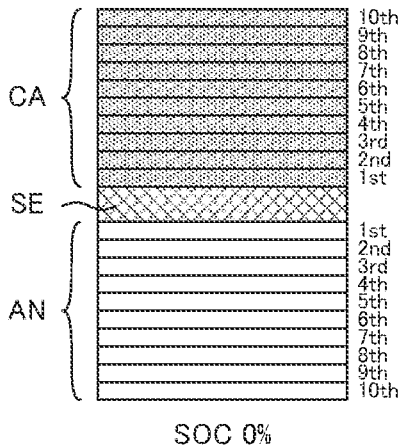
FIG. 6 is an explanatory drawing exemplifying the method for setting the Li occupancy state.

There are no particular limitations on the method for setting the Li occupancy state, and examples thereof may include a method using a model formed by dividing the electrode layer into a plurality of electrode structure layer along with the thickness direction. For example, in a model shown in FIG. 6, layers are arranged in the order of a cathode layer (CA), a solid electrolyte layer (SE), and an anode layer (AN) along with the thickness direction. The cathode layer (CA) includes 10 layers of a cathode structure layer, which are numbered as 1st layer to 10th layer in the order from the solid electrolyte layer (SE) side. Also, the anode layer (AN) includes 10 layers of an anode structure layer, which are numbered as 1st layer to 10th layer in the order from the solid electrolyte layer (SE) side. The model shown in FIG. 6 shows the state where Li is included in the cathode layer (CA) but Li is not included in the anode layer (AN), which corresponds to SOC 0%.

There are no particular limitations on the number of the electrode structure layer, but the accuracy improves as the number increases. The number of the electrode structure layer is, for example, 5 or more, may be 10 or more, may be 50 or more, and may be 100 or more. Meanwhile, the number of electrode structure layer is, for example, 1000 or less. Also, in some embodiments, when N designates the number of the electrode structure layer, the one electrode structure layer corresponds to 1/N of overall capacity of the all solid state battery. Also, in some embodiments, the number of the cathode structure layer and the number of the anode structure layer are the same.

In some embodiments, the setting unit makes a Li occupancy pattern corresponding to the operation history of the all solid state battery using the model. Making of the Li occupancy pattern is, for example, based on following rules. That is, during charge, Li is desorbed from the cathode structure layer closest to the solid electrolyte layer among the cathode structure layers including Li, and Li is intercalated from the anode structure layer closest to the solid electrolyte layer among the anode structure layers not including Li. Conversely, during discharge, Li is desorbed from the anode structure layer closest to the solid electrolyte layer among the anode structure layers including Li, and Li is intercalated from the cathode structure layer closest to the solid electrolyte layer among the cathode structure layers not including Li.

Figure 7A:
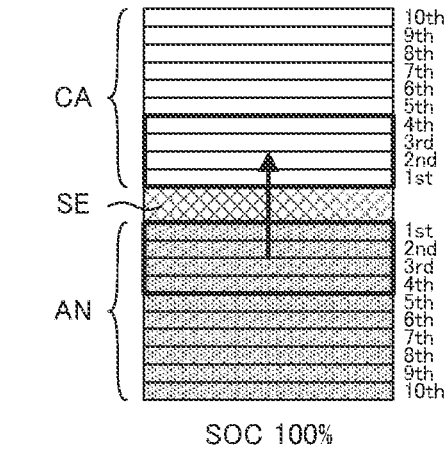
FIG. 7A is an explanatory drawing exemplifying the state where Li is included in the anode layer but Li is not included in the cathode layer, which corresponds to SOC 100%.
Figure 7B:
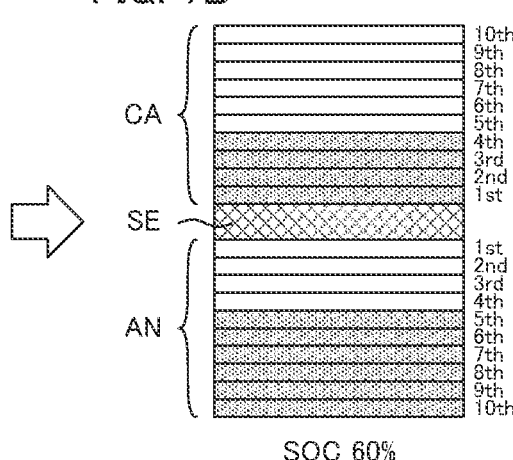
FIG. 7B is an explanatory drawing exemplifying the state which corresponds to SOC 60%.

For example, the Li occupancy pattern shown in FIG. 7A shows the state where Li is included in the anode layer (AN1) but Li is not included in the cathode layer (CA), which corresponds to SOC 100%. From this state, when the amount of 40% of overall capacity of the all solid state battery is discharged, the Li occupancy pattern shown in FIG. 7B is obtained. In specific, Li is desorbed from the anode structure layer (1st layer) closest to the solid electrolyte layer among the anode structure layers including Li, and Li is intercalated to the cathode structure layer (1st layer) closest to the solid electrolyte layer among the cathode structure layers not including Li. In the same manner, Li is desorbed from the anode structure layer (2nd layer), Li is intercalated to the cathode structure layer (2nd layer), Li is desorbed from the anode structure layer (3rd layer), Li is intercalated to the cathode structure layer (3rd layer), Li is desorbed from the anode structure layer (4th layer), and Li is intercalated to the cathode structure layer (4th layer). As a result, the Li occupancy pattern shown in FIG. 7B is obtained.

Figure 8A:
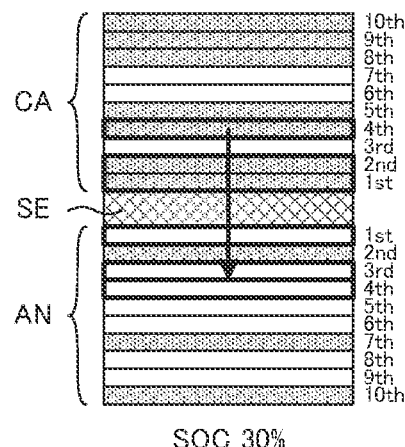
FIG. 8A is an explanatory drawing exemplifying the state where Li is included in the anode layer and the cathode layer.
Figure 8B:
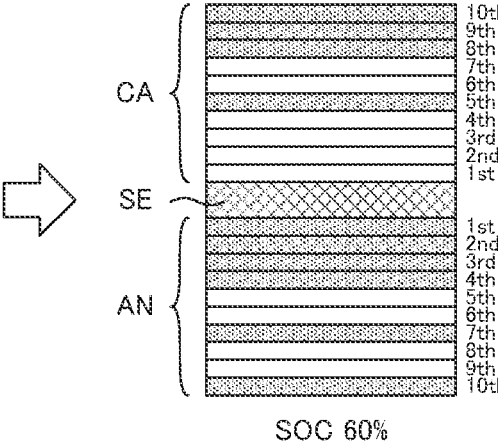
FIG. 8B is an explanatory drawing exemplifying the state which corresponds to SOC 60%.

Also, for example, the Li occupancy pattern shown in FIG. 8A shows the state (SOC 30%) where Li is included in the anode layer (AN) and the cathode layer (CA). From this state, when the amount of 30% of the overall capacity of the all solid state battery is charged, the occupancy pattern as shown in FIG. 8B is obtained. In specific, Li is desorbed from the cathode structure layer (1st layer) closest to the solid electrolyte layer among the cathode structure layers including Li, and Li is intercalated to the anode structure layer (1st layer) closest to the solid electrolyte layer among the anode structure layers not including Li. In the same manner, Li is desorbed from the cathode structure layer (2nd layer), Li is intercalated to the anode structure layer (3rd layer), Li is desorbed from the cathode structure layer (4th layer), and Li is intercalated to the anode structure layer (4th layer). As a result, the Li occupancy pattern shown in FIG. 8B is obtained.

There are no particular limitations on the method for setting the Li occupancy state based on the Li occupancy pattern. The electrode structure layer closer to the solid electrolyte layer is useful in the point of ion moving resistance compared to the electrode structure layer far from the solid electrolyte layer; thus, for example, by weighing the electrode structure layer depending on the distance from the solid electrolyte layer, the Li occupancy state can be set.

In the Li occupancy pattern shown in FIG. 9A, Li is included in the anode structure layers (1st to 6th layers) closer to the solid electrolyte layer (SE), and the ion moving resistance during discharge is the smallest. Conversely, in the Li occupancy pattern shown in FIG. 9B, Li is included in the anode structure layers (5th to 10th layers) farther from the solid electrolyte layer (SE), and the ion moving resistance during discharge is the largest. Then, in the anode layer (AN), for example, the state where Li is included in the anode structure layer (1st layer) closest to the solid electrolyte layer (SE) has 10 points, and in the descending order, for example, the state where Li is included in the anode structure layer (10th layer) has 1 point.

The Li occupancy pattern shown in FIG. 9A has 45 points, and the Li occupancy pattern shown in FIG. 9B has 21 points. By using these points, the Li occupancy state can be set. Examples of the method for setting the Li occupancy state ($\Sigma U$) may include a method of standardizing the points ($0 \le \Sigma U \le 1$). For example, in the case of SOC 60% and 10 layers model as in FIGS. 9A and 9B, $\Sigma U$ of x point can be expressed as $(x-21)/24$. Incidentally, in some embodiments, the weighing for charge in the anode layer is the opposite from that for discharge. In specific, in some embodiments, in the anode layer (AN1), for example, the state where Li is included in the anode structure layer (1st layer) closest to the solid electrolyte layer (SE) has 1 point, and in the ascending order, for example, the state where Li is included in the anode structure layer (10th layer) has 10 points.

In the Li occupancy pattern shown in FIG. 10A, Li is not included in the cathode structure layers (1st to 6th layers) closer to the solid electrolyte layer (SE), and the ion moving resistance during discharge is the smallest. Conversely, in the Li occupancy pattern shown in FIG. 10B, Li is not included in the cathode structure layers (5th to 10th layers) farther from the solid electrolyte layer (SE), and the ion moving resistance during discharge is the largest. Then, in the cathode layer (CA), for example, the state where Li is not included in the anode structure layer (1st layer) closest to the solid electrolyte layer (SE) has 10 points, and in the descending order, for example, the state where Li is not included in the anode structure layer (10th layer) has 1 point.

The Li occupancy pattern shown in FIG. 10A has 45 points, and the Li occupancy pattern shown in FIG. 10B has 21 points. By using these points, the Li occupancy state can be set. Examples of the method for setting the Li occupancy state ($\Sigma U$) may include a method of standardizing the points ($0 \leq \Sigma U \leq 1$). For example, in the case of SOC 60% and 10 layers model as in FIGS. 10A and 10B, $\Sigma U$ of y point can be expressed as $(y-21)/24$. Incidentally, in some embodiments, the weighing for charge in the cathode layer is the opposite from that for discharge.

2. Calculating Unit

The calculating unit in the present disclosure is configured to calculate the remaining battery capacity based on the Li occupancy state.

Figure 11:
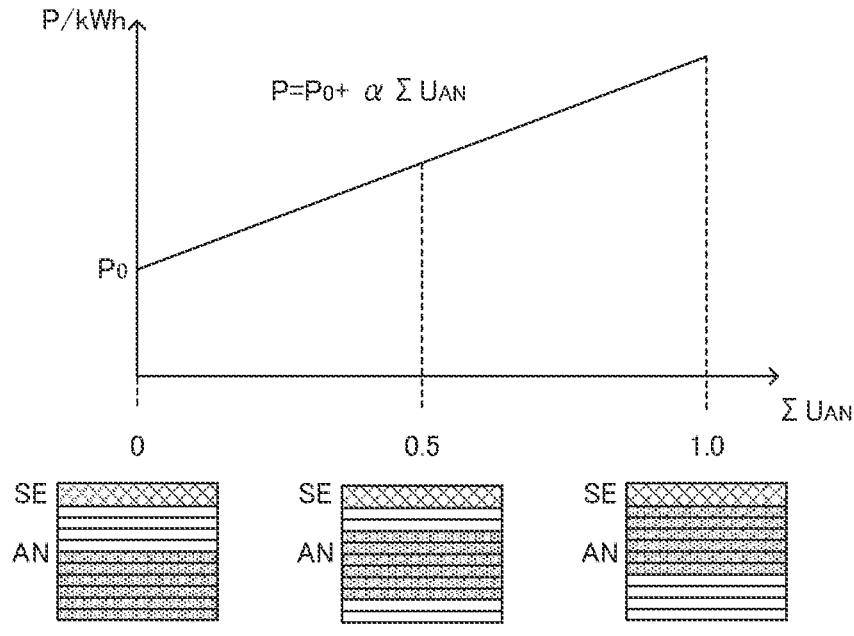
FIG. 11 is an explanatory drawing exemplifying the method for calculating the remaining battery capacity.

Examples of the method for calculating the remaining battery capacity may include a method using the Li occupancy state set in the setting unit, and a map (a map that shows the relationship of the Li occupancy state and the remaining battery capacity). For example, as shown in FIG. 11, a map that shows, the Li occupancy state ($\Sigma U_{AN}$) in the thickness direction of the anode layer in a horizontal axis, and the remaining battery capacity (P) in a vertical axis, is prepared in advanced, then the Li occupancy state ($\Sigma U_{AN}$) set in the setting unit is assigned for a relationship expression specified by the map; thereby the remaining battery capacity P can be obtained. FIG. 11 exemplifies the linear relationship of $P = P_0 + \alpha \Sigma U_{AN}$, provided that $P_0$ is an initial value (an intercept) of the remaining battery capacity and $\alpha$ is Li occupancy coefficient in the anode layer, but the relationship expression to be specified by the map is not limited to the linear relationship.

Figure 12:
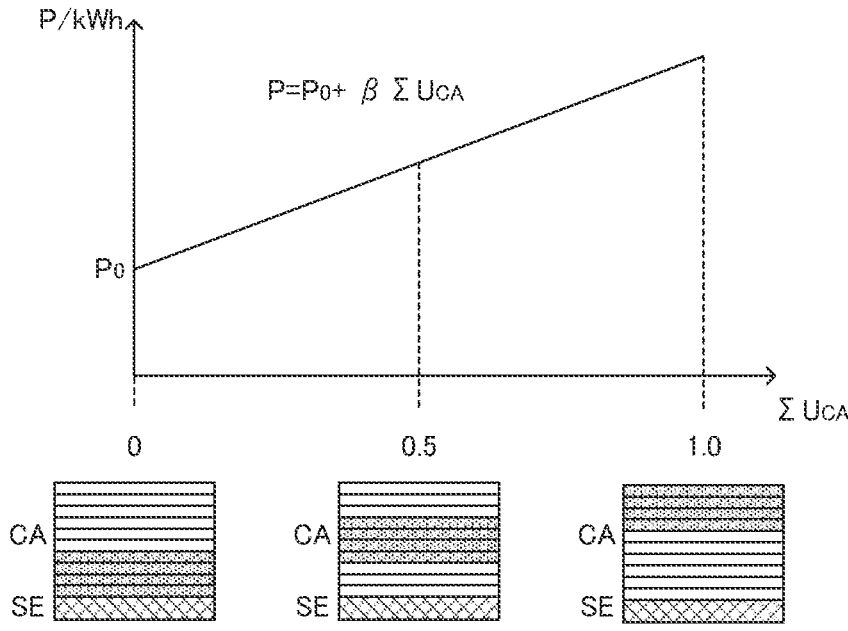
FIG. 12 is an explanatory drawing exemplifying the method for calculating the remaining battery capacity.

Also, as shown in FIG. 12, a map that shows, the Li occupancy state ($\Sigma U_{CA}$) in the thickness direction of the cathode layer in a horizontal axis, and the remaining battery capacity (P) in a vertical axis, is prepared in advanced, then the Li occupancy state ($\Sigma U_{CA}$) set in the setting unit is assigned for a relationship expression specified by the map; thereby the remaining battery capacity P can be obtained. FIG. 12 exemplifies the linear relationship of $P = P_0 + \beta \Sigma U_{CA}$, provided that $P_0$ is an initial value (an intercept) of the remaining battery capacity and $\beta$ is Li occupancy coefficient in the cathode layer, but the relationship expression to be specified by the map is not limited to the linear relationship.

In the present disclosure, as the Li occupancy state, one of $\Sigma U_{AN}$ and $\Sigma U_{CA}$ may be used to calculate the remaining battery capacity, and the both of $\Sigma U_{AN}$ and $\Sigma U_{CA}$ may be used to calculate the remaining battery capacity. In the latter case, as the relationship expression to be specified by the map, for example, $P = P_0 + \alpha \Sigma \Sigma U_{AN} + \beta \Sigma U_{CA}$ may be used. Also, in some embodiments, the map is prepared per, for example, each SOC. Also, the map may be prepared per each SOC and each temperature.

Additional example of the method for calculating the remaining battery capacity may be a method using the Li occupancy state set in the setting unit, and the provisional remaining battery capacity predicted based on the charge state of an all solid state battery. The provisional remaining battery capacity may be predicted based on SOC similarly to conventional method. For example, the remaining battery capacity may be calculated by multiplying the provisional remaining battery capacity by a coefficient based on the Li occupancy state.

3. Correcting Unit and Feedback Unit

The correcting unit in the present disclosure is configured to correct the Li occupancy state set in the setting unit based on the operation history of the all solid state battery. In specific, after the Li occupancy state is set in the setting unit, the Li occupancy state is corrected based on the operation history of the all solid state battery. The electrode layer for correcting the Li occupancy state may be one of the cathode layer and the anode layer, and may be the both of the cathode layer and the anode layer.

There are no particular limitations on the method for correcting the Li occupancy state, and examples thereof may include a method using a model formed by dividing the electrode layer into a plurality of electrode structure layer along with the thickness direction. The method for correcting the Li occupancy state is the same as the method for setting the Li occupancy state described above; thus, the descriptions herein are omitted.

The feedback unit in the present disclosure is configured to feed back the corrected Li occupancy state to the calculating unit. The calculating unit calculates the remaining battery capacity again based on the corrected Li occupancy state, and thus the accuracy of the remaining battery capacity of an all solid state battery may further improve. In particular, in the present disclosure, in some embodiments, the calculating unit, the correcting unit and the feedback unit are configured to work during operation of the all solid state battery. The reason therefor is to calculate the remaining battery capacity of the all solid state battery in real time. In some embodiments, the correcting of the Li occupancy state is, for example, performed per specified time.

Also, the calculation device may further include a processing block such as an obtaining unit configured to obtain the state (such as voltage, current, and temperature) of the all solid state battery, a memory unit configured to memorize a map showing a relation of the Li occupancy state and another parameter (such as the remaining battery capacity), and a predicting unit configured to predict provisional remaining battery capacity based on charge state of the all solid state battery.

B. All Solid State Battery System

FIG. 2 is a diagram exemplifying the all solid state battery system in the present disclosure. All solid state battery system 100 shown in FIG. 2 comprises all solid state battery 10, monitoring unit 20, and ECU 30. The ECU 30 works as the calculation device described in "A. Calculation device" above.

According to the present disclosure, the arrangement of the above described calculation device allows an all solid state battery system to accurately calculate the remaining battery capacity of the all solid state battery.

1. Calculation Device

The calculation device in the present disclosure is in the same contents as those described in "A. Calculation device" above; thus, the explanation herein is omitted.

2. All Solid State Battery

The all solid state battery in the present disclosure includes a cathode layer, a solid electrolyte layer, and an anode layer. The cathode layer contains at least a cathode active material, and may contain at least one of a solid electrolyte, a conductive material and a binder, as required. Also, the anode active layer contains at least an anode active material, and may contain at least one of a solid electrolyte, a conductive material and a binder, as required. Also, the solid electrolyte layer contains at least a solid electrolyte, and may contain a binder as required.

Examples of the solid electrolyte used in the all solid state battery may include an inorganic solid electrolyte such as a sulfide solid electrolyte, an oxide solid electrolyte, and a halide solid electrolyte. The kind of the all solid state battery is not particularly limited, and examples thereof may include a lithium ion secondary battery. Also, in some embodiments, the all solid state battery is a driving battery configured to drive a moving body.

3. Monitoring Unit

The battery system in the present disclosure usually comprises a monitoring unit configured to monitor the state of the all solid state battery. Examples of the monitoring unit may include a voltage sensor measuring the voltage of the all solid state battery, a current sensor measuring the current of the all solid state battery, a temperature sensor measuring the temperature of the all solid state battery, and a vibration sensor measuring the vibration applied to the all solid state battery.

4. All Solid State Battery System

The application of the all solid state battery system in the present disclosure is not particularly limited, but, in some embodiments, is a system used for vehicles such as hybrid electric vehicles, battery electric vehicles, fuel cell electric vehicles and diesel powered automobiles. Also, the all solid state battery system in the present disclosure may be used as a system used for moving bodies other than vehicles (such as rail road transportation, vessel and airplane).

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SINGS LIST 1 cathode layer
2 anode layer
3 solid electrolyte layer
4 cathode current collector
5 anode current collector
10 all solid state battery
20 monitoring unit
30 electron control unit
200 vehicle

What is claimed is:

1. A calculation device configured to calculate remaining battery capacity of an all solid state battery including a cathode layer, a solid electrolyte layer, and an anode layer, the all solid state battery comprising a sulfide solid electrolyte, an oxide solid electrolyte, or a halide solid electrolyte, the calculation device comprising:

a voltage sensor configured to measure a voltage of the all solid state battery;

a current sensor configured to measure a current of the all solid state battery;

a temperature sensor configured to measure a temperature of the all solid state battery;

a memory configured to memorize a map showing a relation of a Li occupancy state in a thickness direction of an electrode layer which is at least one of the cathode layer and the anode layer and the remaining battery capacity;

a central processing unit configured to:

set the Li occupancy state based on operation history of the all solid state battery, the Li occupancy state is set based on the voltage of the all solid state battery, the current of the all solid state battery, the temperature of the all solid state battery, or a combination thereof; and calculate the remaining battery capacity based on the Li occupancy state set and the map by one of the following relationship expressions:

$$P=P_0+\alpha\Sigma U_{AN};\text{ and}$$

$$P=P_0+\beta\Sigma U_{CA};$$

wherein P is a battery remaining, $P_0$ is an initial value of the battery remaining, $\alpha$ is Li occupancy coefficient in the anode layer, $\Sigma U_{AN}$ is the Li occupancy state in the thickness direction of the anode layer, $\beta$ is Li occupancy coefficient in the cathode layer, and $\Sigma U_{CA}$ is the Li occupancy state in the thickness direction of the cathode layer.

2. The calculation device according to claim 1, wherein the central processing unit is configured to make a Li occupancy pattern corresponding to the operation history of the all solid state battery by using a model formed by dividing the electrode layer into a plurality of electrode structure layer along with the thickness direction, and is configured to set the Li occupancy state based on the Li occupancy pattern.

3. The calculation device according to claim 1, wherein the central processing unit is configured to:

predict provisional remaining battery capacity based on charge state of the all solid state battery; and calculate the remaining battery capacity based on the Li occupancy state set, and the provisional remaining battery capacity.

4. The calculation device according to claim 1, wherein the central processing unit is further configured to:

correct the Li occupancy state set based on the operation history of the all solid state battery; and feed back the corrected Li occupancy state to the calculating unit.

5. The calculation device according to claim 4, wherein the central processing unit is configured to work during operation of the all solid state battery.

6. The calculation device according to claim 4, wherein the central processing unit is further configured to make a Li occupancy pattern corresponding to the operation history of the all solid state battery by using a model formed by dividing the electrode layer into a plurality of electrode structure layer along with the thickness direction, and is configured to correct the Li occupancy state based on the Li occupancy pattern.

7. An all solid state battery system comprising:

an all solid state battery including a cathode layer, a solid electrolyte layer and an anode layer; and a calculation device configured to calculate remaining battery capacity of the all solid state battery; wherein the calculation device is the calculation device according to claim 1.

8. The calculation device according to claim 1, wherein the Li occupancy state is weighed based on an Li occupancy percentage in the electrode layer and the distance from the occupied Li in the electrode layer to the electrolyte layer.

* * * * *